Feb. 24, 1959   M. B. STULL   2,874,881
LIQUID DISPENSING DEVICE
Filed Sept. 7, 1955
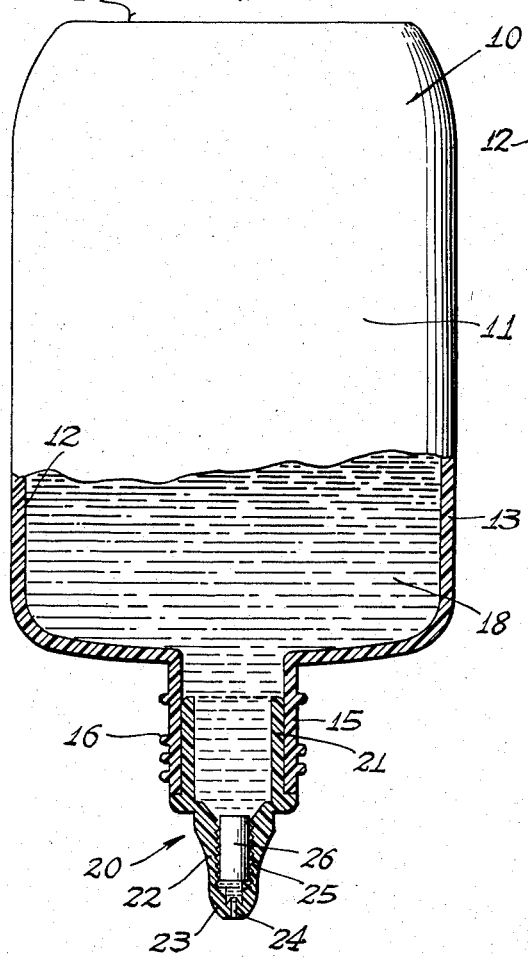
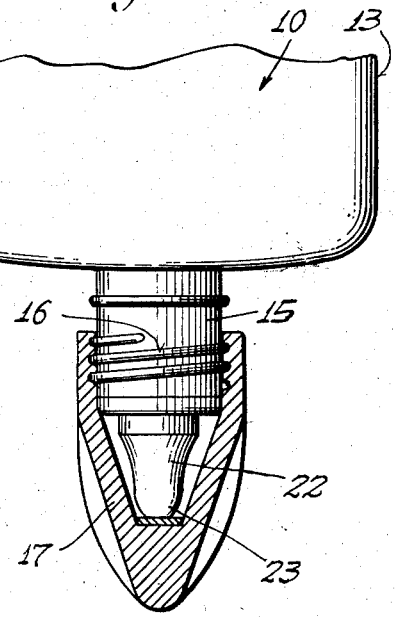
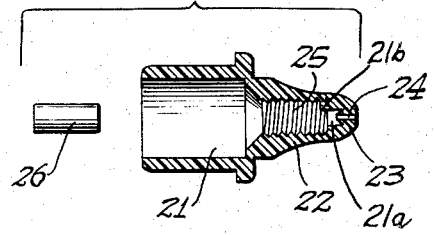
INVENTOR.
Morton B. Stull
BY
Herbert F. Lehmann
AGENT

# United States Patent Office 2,874,881
Patented Feb. 24, 1959

2,874,881

LIQUID DISPENSING DEVICE

Morton B. Stull, Clifton, N. J.

Application September 7, 1955, Serial No. 532,875

1 Claim. (Cl. 222—421)

This invention relates to means for dispensing liquids from containers, and more particularly to a drop-dispensing device for use with containers such as bottles, vials, and the like.

The invention as illustrated and described comprises a plug or stopper for use with plastic squeeze bottles; however, it should be understood that the invention is not limited to the particular embodiment shown, nor the particular use and application, since it has utility generally in the field of drop-dispensing devices.

Heretofore, plastic squeeze type bottles have been provided with a drop-dispensing stopper which incorporated a steel ball bearing press-fitted into a socket formed in the passage through the plug, thereby to control the flow of the liquid. This arrangement was not entirely practical, since it required that either the producer or his customer subject the ball bearings to tests, in order to determine the compatability of the metal with the liquid which is to be used. Certain of the more corrosive liquids would require expensive stainless steel or Monel bearings, while others which were not quite so corrosive could be handled by the cheaper grades of steel. The necessity for the producer or customer setting up a series of tests is of distinct disadvantage. In some cases there is lacking the personnel to carry out such tests, as well as the scientific data, knowledge and equipment. In addition, this type of construction makes it necessary to carry an inventory of ball bearings made according to different formulations, which is a further drawback.

In addition to this, where the stoppers are shipped by a producer to his customer it was often found that, during transit or handling, the ball bearings would become disengaged from their sockets and lay loose in the package. Thus, when the customer opened the package to take out the stoppers, he would find a lot of loose ball bearings and would be confronted with the problems of determining which stoppers had lost their bearings and of replacing the balls in the deficient stoppers. This was obviously a source of annoyance to the customer, and in any circumstance represented poor business.

In accordance with the present invention an improved drop-dispensing device is provided which does not require steel or metal parts or components, nor does it use components which are loosely carried and which may be inadvertently displaced or dislocated from their proper positions. Instead, the device of this invention may be advantageously made entirely from moldable materials, such as plastic and kindred materials and particularly plastic such as polyethylene, which is resistant to most slightly corrosive liquids. The invention thus obviates the drawbacks and disadvantages of the metal-ball type of drop-dispensing device, and also other devices employing metal components.

Accordingly an object of the invention is to provide novel and improved relatively inexpensive flow-control means for dispensing liquids in controlled amounts, which is so constituted that it can readily handle a wide range of liquids without danger of becoming corroded or being rendered inoperative by the corrosive action of said liquids.

Another object of the invention is to provide an improved flow controlling or drop-dispensing means as above set forth, which does not require the use of steel or other metal parts or components but instead may be made of inexpensive, corrosion-resistant plastic material.

A still further object of the invention is to provide an improved flow-controlling device as characterized above, which is relatively simple and economical in construction, requiring but few parts which may be easily and inexpensively formed or molded.

Yet another object of the invention is to provide a novel flow-controlling structure as above, which is reliable in its operation at all times, having no moving parts to get out of order.

A feature of the invention resides in the provision of an improved flow controlling means of the above type, wherein a relatively long channel or passage is provided for the fluid to flow through, without requiring excessive or appreciable length of the structure.

Another feature of the invention resides in the provision of an improved drop-dispensing device as above set forth, wherein a long and tortuous passage is provided for the fluid in a simple and economical manner.

Yet another feature of the invention resides in the provision of a novel drop-dispensing plug or stopper having a relatively long channel of small area, for the passage of the liquid, which nevertheless may be easily and economically formed or molded.

Other features and advantages will hereinafter appear.

In the drawing accompanying this specification, similar characters of reference indicate corresponding parts in the several views, in which:

Fig. 1 is a view partly in side elevation and partly in vertical section of a squeeze bottle and dropper-dispensing plug made in accordance with the invention.

Fig. 2 is an elevational view of the dispensing plug and neck and adjoining portions of the bottle.

Fig. 3 is an exploded view of the dispensing device, showing the body of the plug in axial section.

Referring to Figs. 1 and 2 there is shown a container 10 which is in the form of a plastic squeeze bottle formed of polyethylene or the like. It will be understood that the squeeze bottle 10 may have any desired configuration or shape suitable for the particular purpose desired. Preferably the bottle is oval in transverse section, having expansive front and back walls 11, side walls 12 and 13 and a bottom wall 14. The walls of the bottle are flexible, so that when the front and back walls 11 are pressed on, they will move inwardly or toward each other, tending to eject the contents.

As is usual, the bottle 10 has a neck 15 provided with external screw threads 16 to accommodate a screw cap 17. Within the bottle 10 there is shown liquid 18, which is to be dispensed from the bottle in droplet quantities.

In accordance with the present invention I provide a novel and improved, flow-controlling stopper 20 which is preferably arranged to be press-fitted in the neck 15 of the bottle 10. The stopper 20 may be made of inexpensive, noncorrosive material other than metal, for example polyethylene, whereby the cost is held to a minimum. Moreover, I effect a desirable and advantageous control of the flow of liquid from the bottle by simple and economical-to-fabricate structure which is characterized by relatively few stationary parts providing an elongate, tortuous passage of small cross section without requiring excessive length of the plug or stopper. With the present improved stopper construction it is not necessary to mold or otherwise form a long passage of restricted area, which would be extremely difficult and costly if not impossible by mass production methods.

Referring to Figs. 1 and 3, my improved flow-controlling stopper comprises a tubular body member 21 arranged to be press fitted in the neck 15 of the bottle 10, said body member having a tip or extension 22 of somewhat conical configuration provided with a blunt tip 23 having an orifice 24. Within the extension 22 there are provided internal screw threads 25, which may be of conventional type, such threads constituting a helical rib and forming the walls of a helical groove, as will be readily understood. Also, there is a cavity 21a within the tip 23, and a small projection or shoulder 21b extending radially inward or toward the axis of the body member 21, said projection being located between the grooved walls of the threaded portion 25 and the cavity 21a. The stopper 20 also comprises a plug 26 having a diameter such that it may be press-fitted into the extension 22 the plug being stopped and positioned by the projection 21b, said plug distorting slightly the crests of the screw threads 25 and being frictionally retained thereby, as clearly shown in Fig. 1.

By the provision of the screw threads 25 and the press-fitted plug 26 there is effected between the threads an elongate, narrow, tortuous path or passage similar in configuration to a cork screw which the liquid 18 must traverse in flowing from the interior of the bottle 10 out through the discharge orifice 24.

I have found that it is possible to so construct the screw threads and plug 26 as to effect a very small cross section throughout the said tortuous path for the liquid. I thus accomplish a three-fold result by the above construction, as follows: (1) A path of relatively great length is obtained. (2) The path may have a very small cross section. (3) I obtain the said path of great length and small cross section of a simple structure which may be readily economically produced by mass-production procedures.

The present improved stopper made in accordance with my invention as set forth above is extremely effective in enabling the contents of a container to be ejected under such control that the discharge will occur one drop at a time, for a total of as many drops as may be desired. The ejection may be readily accomplished and controlled by merely squeezing together the sides of the bottle 10, or it may be effected in any other suitable manner by which a pressure is applied to the liquid within the container. The stopper involves no movable parts likely to get out of order, or become jammed and inoperative. Moreover, no metal is required in the construction, but instead the components may be readily formed of corrosion-resistant, moldable plastic. Of course, metal may be used to suit particular conditions and characteristics of the liquid being handled.

While the improved flow control means which I have devised is shown in the form of a stopper, it should be understood that this is merely for illustrative purposes and not to be taken in a restricted sense, since obviously the novel principles are not restricted to use in a stopper.

As shown in Fig. 2 when the bottle is not being used for dispensing the liquid, the cap 17 may be screwed on the neck 15, to seal the discharge orifice 24 and prevent leakage of the liquid 18.

While it is preferred that the stopper member 21 be of yieldable or flexible plastic material, this is not necessary since it may be made of metal if desired. For such construction, the plug 26 is preferably yieldable, and if the plug 26 be made of metal then the body member 21 is preferably yieldable. Where close tolerances are no problem, both the plug 26 and body member 21 may be made of metal and a reaming operation may be performed on the screw threads 25 to size the crests thereof so that they readily frictionally receive and retain the plug.

Variations and modifications may be made within the scope of the claims and portions of the improvements may be used without others.

I claim:

A liquid flow control means for dispensing liquids in controlled amounts from a container, comprising a molded, flexible member provided with a passage having a substantially constant cross-sectional area throughout its length, said passage constituting a path for said liquids, the walls of said passage having a groove extending around the axis of the passage between two axially-spaced points; and a straight solid plug having a substantially constant cross-sectional area throughout its length, disposed in said passage and held therein by a press fit, said plug closing the passage except for the groove whereby liquid flowing through the passage will be required to traverse the narrow, elongate path provided by the groove, said member having at one end a restricted discharge orifice and a cavity disposed between the said orifice and one end of the plug; and a shoulder located between the grooved walls and the cavity, engaging the end of the plug for positioning the same.

References Cited in the file of this patent

UNITED STATES PATENTS

| | | |
|---|---|---|
| 2,310,777 | Giavotto | Feb. 9, 1943 |
| 2,314,676 | Wilson | Mar. 23, 1943 |
| 2,570,955 | Keeshan | Oct. 9, 1951 |
| 2,576,403 | Kirschenbaum | Nov. 27, 1951 |
| 2,657,836 | Heinz et al. | Nov. 3, 1953 |

FOREIGN PATENTS

| | | |
|---|---|---|
| 511,235 | Belgium | May 31, 1952 |